July 29, 1941.    A. GONZALES    2,250,830
COMBINATION MEASURING DEVICE
Filed Nov. 30, 1940    2 Sheets-Sheet 1
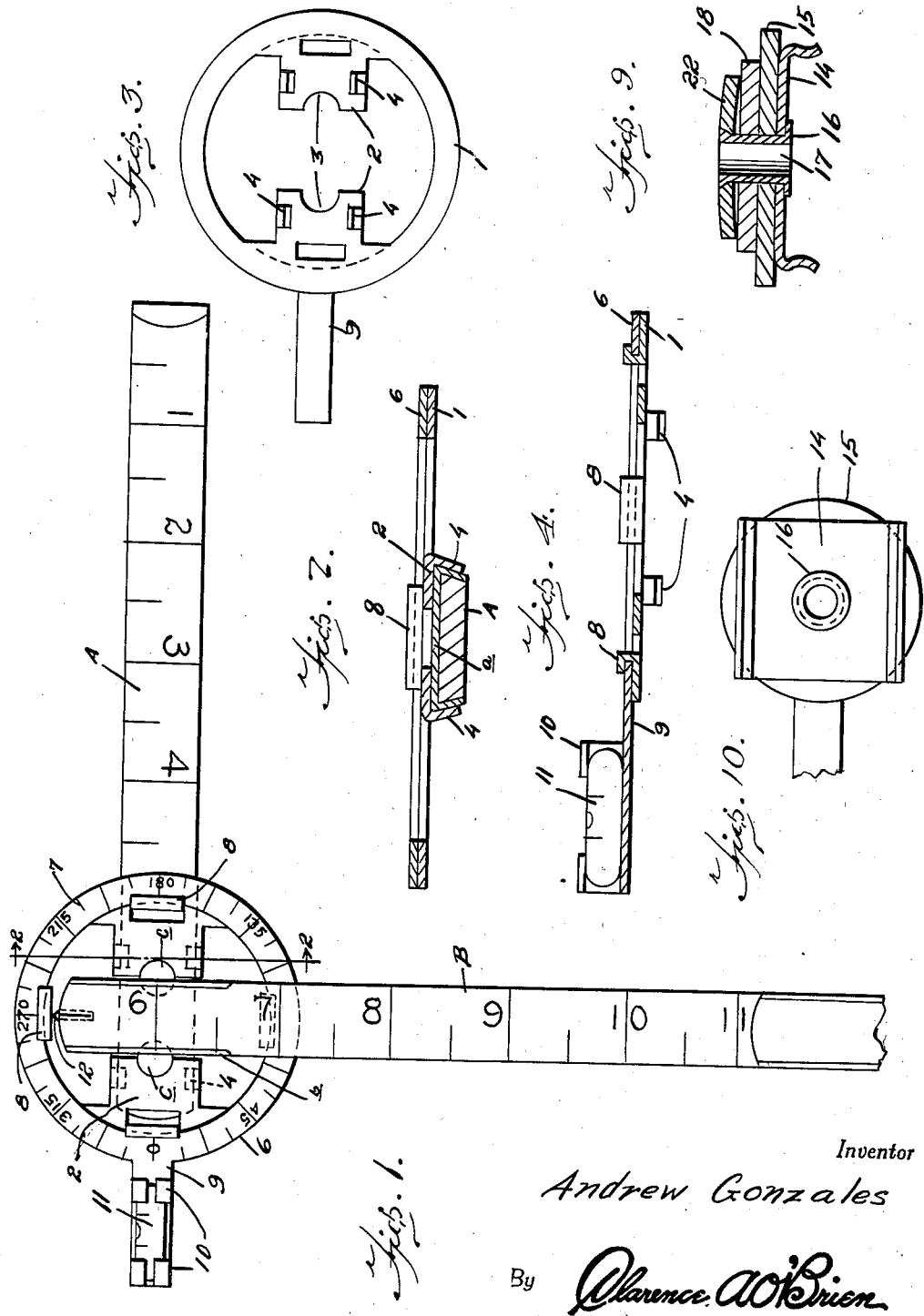
Inventor
Andrew Gonzales
By Clarence A. O'Brien
Attorney July 29, 1941.        A. GONZALES        2,250,830
COMBINATION MEASURING DEVICE
Filed Nov. 30, 1940        2 Sheets-Sheet 2
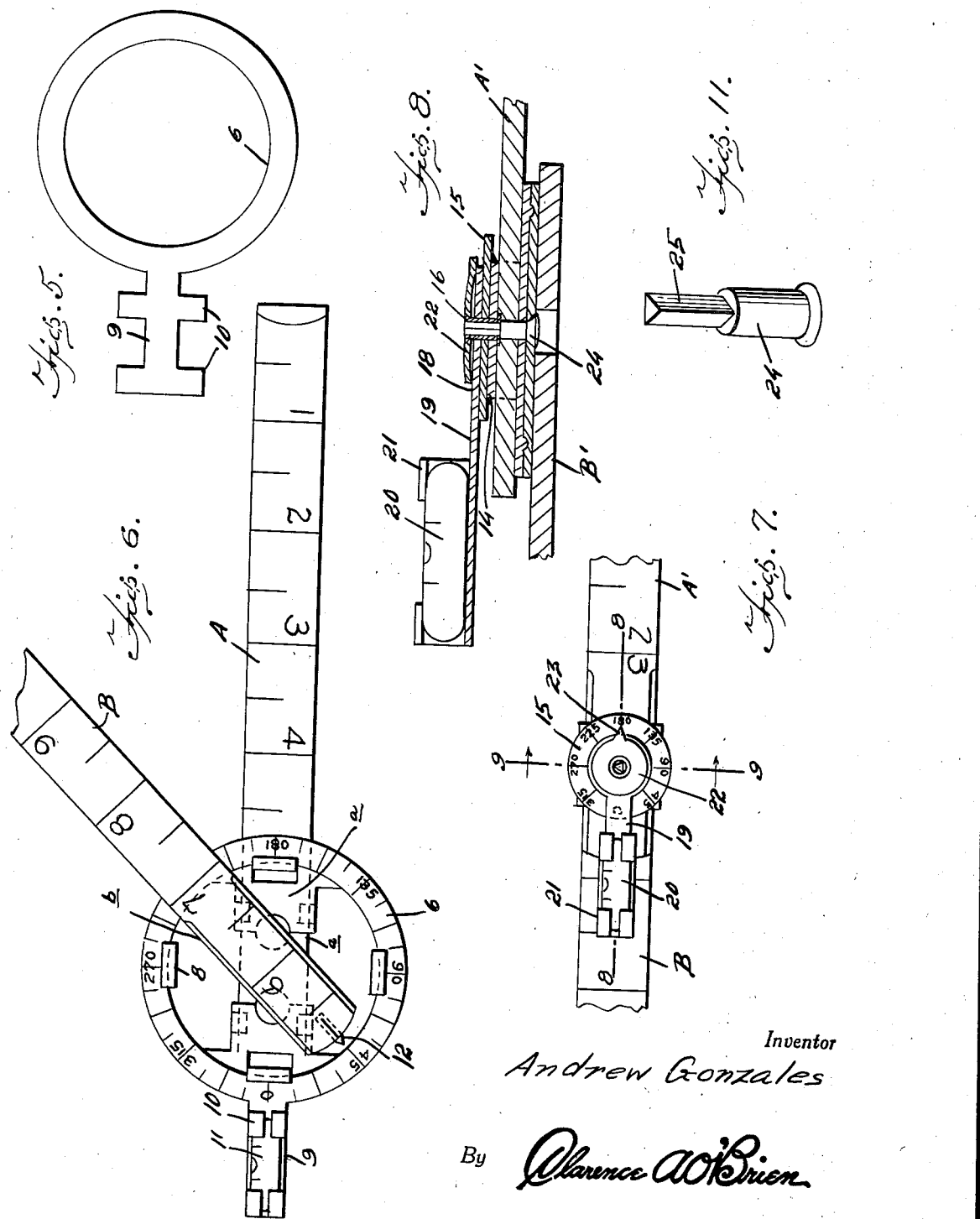
Inventor
Andrew Gonzales
By Clarence A. O'Brien
Attorney Patented July 29, 1941

2,250,830

UNITED STATES PATENT OFFICE 2,250,830

COMBINATION MEASURING DEVICE

Andrew Gonzales, San Antonio, Tex., assignor of one-half to Quon Wee, San Antonio, Tex.

Application November 30, 1940, Serial No. 368,064

3 Claims. (Cl. 33—115)

This invention relates to a combination measuring instrument, the general object of the invention being to provide means for facilitating measuring of angles, the scribing of circles and arcs and the determining whether or not a particular piece of work is in the desired plane.

The purpose of the invention is to provide a cheaper, simpler and more compact arrangement of tools than a carpenter or other mechanic usually carries to perform the indicated operations as well as cheaper tools for students and apprentices.

Another object of the invention is to so make the device that it can be used with an ordinary extension rule and also to make the device with an extension rule so that one can buy the device applied to the rule or he can buy the device in a different form and apply it to the rule which he already has.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a view showing the device applied to an extension rule and showing that form of the invention which can be applied to a rule as already manufactured.

Figure 2 is a section on approximately the line 2—2 of Figure 1.

Figure 3 is a bottom plan view of the two part circular member removed from the rule.

Figure 4 is a sectional view through the two part circular member.

Figure 5 is a view of the upper part of the circular member before the clips are bent to engage the spirit level.

Figure 6 is a top plan view but showing one section of the rule in a different position from that shown in Figure 1.

Figure 7 is a top plan view of a modified form of the invention or that form in which the invention is connected with the rule during the manufacture of the rule.

Figure 8 is a section on the line 8—8 of Figure 7.

Figure 9 is a section on the line 9—9 of Figure 7.

Figure 10 is a bottom plan view of the major parts of the invention.

Figure 11 is a view of the bolt or rivet used to connect the parts shown in Figure 10 to portions of the rule.

Referring to Figures 1 to 6, which show the invention in the form of an attachment for a rule, the numeral 1 indicates the lower ring which is formed with the oppositely arranged and inwardly extending lugs 2 which have semi-circular openings 3 in their inner ends and tongues 4 struck from their side edges. These lugs rest on an end portion of one section A of an extension rule with the tongues 4 bent over into gripping relation with side edge portion of the metal plate $a$ which is fastened to said end portion of said section A and carries the pivot which connects the metal plate $b$ of the section B of the rule to pivotally connect the two sections together. The recesses or openings 3 engage portions of the studs $c$ formed on the plate $a$ which are adapted to engage recesses in the plate $b$ in the well known manner. Thus the ring 1 is attached to the section A and the parts are so arranged that the section B can pivot on the section A in the usual manner without interference from the parts of the invention. The upper ring is shown at 6 and its upper face is graduated as shown at 7 to indicate the degrees of a circle and the top ring is rotatably connected with the bottom ring by the tongues 8 struck from parts of the bottom ring and bent over portions of the inner periphery of the top ring. An arm 9 extends radially from a portion of the outer periphery of the top ring and has tongues 10 formed on its side edges which are bent over to hold a spirit level 11 on the arm.

Thus it will be seen that the device is fastened to one end of one section of the rule and the adjacent end of another section can be moved over the device as said other section is moved on its pivot which connects the two sections together. The section B at its pivoted end is provided with a pin 12 which acts as a pointer for the graduations on the top ring to facilitate the placing of the two sections A and B to form the desired angle, for example, either in the position shown in Figure 1 or that shown in Figure 6. Thus the angular relation of the two sections of the rule can be determined with accuracy.

It will be seen that the device enables the sections of the rule to be used as a compass for making circles or arcs. For instance, the section B can be swung on its pivot in a circle or arc. A pencil at one side edge of the section B at the proper graduation thereon will make a circle or arc of any desired diameter as the parts are moved.

As before stated this form of the invention can be bought and applied to a rule very easily as it is simply necessary to place the parts between the two pivoted end portions of the two sections and then bend the tongues 4 over one section with the recesses 3 engaging the projections c of said section with the other section passing over the top of the device. By providing the spirit level the device can be used for leveling objects in the usual manner.

In that form of the invention which is manufactured with the rule and which is shown in Figures 7 to 11 a channel-shaped member 14 fits over an end portion of a section A' of the rule and a dial or graduated disk 15 is fastened to the top portion of the channel-shaped member in any suitable manner and a hollow rivet 16 having a non-circular opening or bore 17 therein passes for rotary movement through the members 14 and 15 and has rotatably attached to its upper end an enlarged end 18 of an arm 19 which carries the spirit level 20 through means of the bent tongues 21 and a disk 22 is attached to the upper extremity of the rivet to move therewith and said disk carries the pointer 23 for cooperating with the graduations on the dial or disk 15 as shown in Figure 7. This disk 22 is preferably made as shown in Figure 9 to have a certain amount of resiliency for frictionally engaging the part 18 to prevent too free movement of the arm carrying member 15. A pivot pin 24 pivotally connects the section A' with the section B' of the two rules and the upper end of the rivet is of triangular shape in cross section as shown at 25 to engage the bore 17 so that the sleeve will move with the pin, the head of the rivet being fastened to the section B' so that it will rotate when the section B' is moved and thus the arm 19 and the disk 22 will move with the section B' so that the pointer will indicate the relative angular position of the two sections A' and B' of the rule. As will be seen this form of the invention will work the same as the first form though it forms a permanent part of the rule and the rule with the invention thereon is sold as a complete device.

In both forms of the invention the parts are so small that a carpenter, for instance, can carry the rule with the invention thereon in his pocket and the invention will add but little to the cost of the rule when forming a permanent part thereof and, of course, the attachment shown in the first form can be manufactured to sell at low cost and it can be readily applied to a rule.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In combination with a foldable rule including a pair of sections having their end portions pivotally connected together, the pivot including a member connected to one rule section, with the second rule section pivoted, a graduated member supported on the exposed face of the second rule section with its graduations arranged concentric with the pivot, a pointer carrying member above the graduated member with its pointer cooperating with the graduations thereof and means for engaging the pointer carrying member with the pivot to prevent relative movement between the pivot and the pointer carrying member.

2. In combination with a foldable rule including a pair of sections pivotally connected together at their end portions, the pivot including a member connected to one rule section and on which the second rule section pivots, a member connected with the second rule section, a graduated member having its graduations arranged in a circle concentric with the pivot, means for connecting the graduated member with the first member, a hollow rivet rotatably arranged in the first and second members, a pointer carrying member on the rivet the pointer of which cooperates with the graduations, a part of the pivot member non-rotatably engaging the hollow rivet to cause movement of the pointer member with the first rule section.

3. In combination with a foldable rule including a pair of sections pivotally connected together at their end portions, the pivot including a member connected to one rule section and on which the second rule section pivots, a member connected with the second rule section, a graduated member having its graduations arranged in a circle concentric with the pivot, means for connecting the graduated member with the first member, a hollow rivet rotatably arranged in the first and second members, a pointer carrying member on the rivet the pointer of which cooperates with the graduations, a part of the pivot member non-rotatably engaging the hollow rivet to cause movement of the pointer member with the first rule section, an arm having its inner end rotatably connected with the hollow rivet and means for supporting a spirit level on the arm.

ANDREW GONZALES.